United States Patent [19]

Hinn

[11] Patent Number: 4,716,461

[45] Date of Patent: Dec. 29, 1987

[54] VIDEO SIGNAL BLANKING INTERVAL SIGNAL CONDITIONING CIRCUIT

[75] Inventor: Werner Hinn, Zollikerberg

[73] Assignee: RCA Corporation, Princeton, N.J.

[21] Appl. No.: 857,047

[22] Filed: Apr. 29, 1986

[30] Foreign Application Priority Data

Oct. 1, 1985 [GB] United Kingdom ............... 8524200

[51] Int. Cl.⁴ ..................... H04N 3/24; H04N 5/18
[52] U.S. Cl. ................................. 358/165; 358/172
[58] Field of Search ............... 358/165, 171, 172, 33, 358/34

[56] References Cited

U.S. PATENT DOCUMENTS 4,562,475 12/1985 Levine ................. 358/171

FOREIGN PATENT DOCUMENTS 0115196 8/1984 European Pat. Off. ............ 358/172

OTHER PUBLICATIONS

Partial schematic circuit diagram of video monitor Model DC-1, manufactured by RCA Corp.
Partial schematic circuit diagram of video monitor Model CTVM 4, manufactured by Barco Corp.

Primary Examiner—James J. Groody
Assistant Examiner—David E. Harvey
Attorney, Agent, or Firm—Paul J. Rasmussen; Peter M. Emanuel; Ronald H. Kurdyla

[57] ABSTRACT

A wideband video signal processing system includes a blanking interval signal conditioning circuit with reduced parasitic capacitance. The circuit has an AC coupling capacitor connected between an input buffer amplifier and an output buffer amplifier. A first keyed electronic switch of the single pole, single throw type is coupled in series between the output of the first buffer and the capacitor. A second keyed electronic switch of the single pole, single throw type is coupled between the output of the capacitor and a reference voltage. The first and second switches are keyed to establish a fixed video signal reference value during image blanking intervals.

10 Claims, 3 Drawing Figures

VIDEO SIGNAL BLANKING INTERVAL SIGNAL CONDITIONING CIRCUIT

This invention concerns a circuit, such as a blanking and clamping circuit, for conditioning the blanking intervals of a video signal in a wide bandwidth video signal processing and display system such as a video monitor.

The video signal processed by a video monitor is often clamped before being applied to a video output display driver stage. Clamping is employed to eliminate horizontal and vertical synchronizing (sync) pulses, and to insert a defined reference level during image blanking intervals. Clamping also assists to establish a well-defined DC operating point for the display driver stage in order to avoid unwanted changes in driver stage transfer characteristics related to linearity and phase response, for example. Wideband display driver stages preferably operate with a substantially fixed DC operating point so that the driver stage is not required to accommodate large output DC level shifts. Large output DC level shifts result in increased power consumption and dissipation for a wideband driver stage which is often already operating at increased DC current levels. Operating point variations also influence the capacitance parameters of display driver transistors, undesirably causing operating bandwidth variations with shifts in transistor DC bias.

In wideband video signal processing channels, special care must be taken to prevent the bandwidth of the video channel from being impaired by blanking interval signal conditioning circuits such as blanking and clamping circuits. It is therefore desirable to construct such signal conditioning circuits with few components so as to reduce the bandwidth impairing loading of the video signal path by parasitic capacitances associated with the signal conditioning circuit. A video signal blanking interval signal conditioning circuit in accordance with the principles of the present invention accomplishes this result.

In a disclosed preferred embodiment of a blanking interval signal conditioning circuit according to the present invention, a first electronic switch couples a video signal from an input buffer amplifier to an input electrode of an AC coupling capacitor. A second electronic switch is coupled to an output electrode of the capacitor, which is coupled to an output buffer. The first and second switches are of the single pole, single throw type, the first switch being placed in series with the input of the coupling capacitor, and the second switch being placed in shunt with the output electrode of the coupling capacitor. The first switch is normally keyed to conduct during image trace intervals and during a reference portion, e.g., a portion of the back-porch interval, of image retrace blanking intervals, and is nonconductive at other times. The second switch is normally keyed to conduct only for the duration of each image retrace blanking interval.

Figure 1:
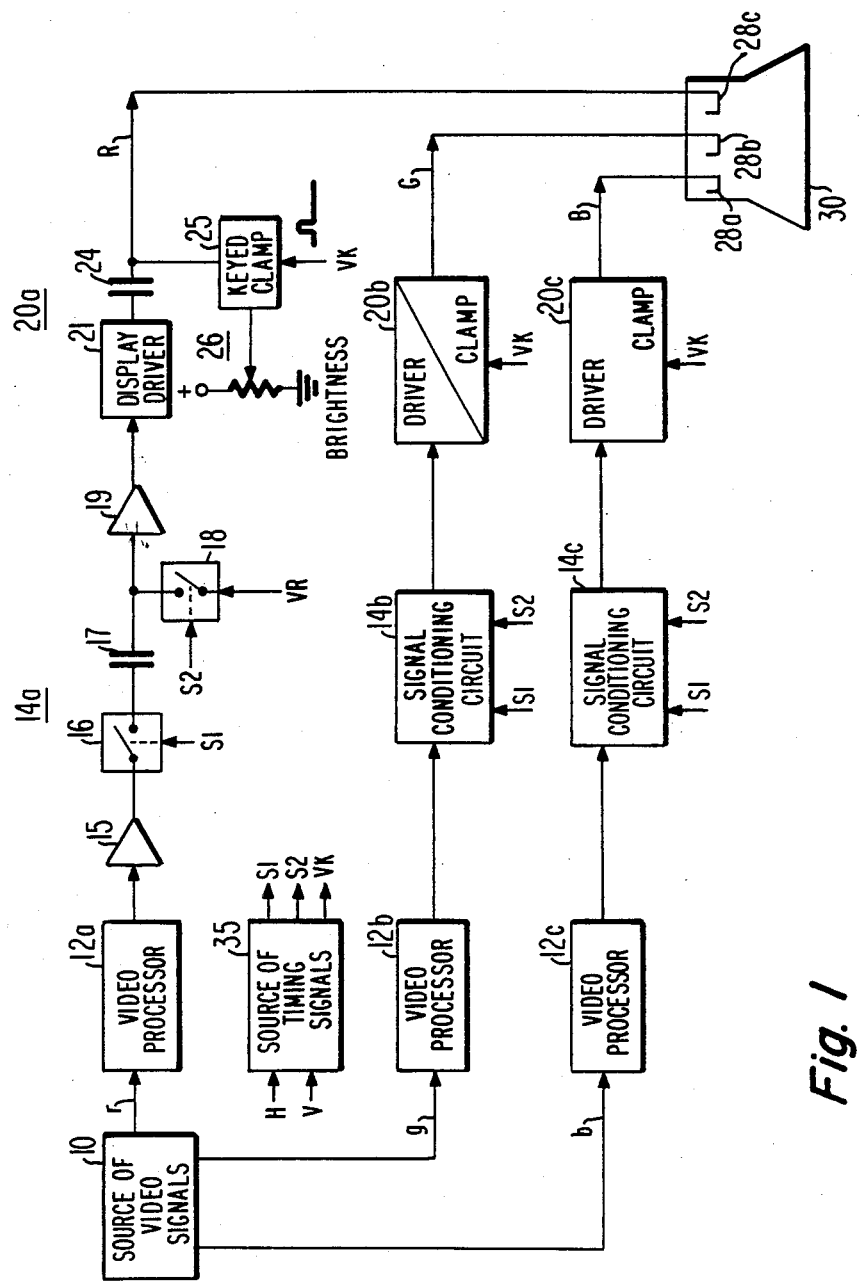
FIG. 1 illustrates a portion of a wideband video monitor including a video signal conditioning circuit in accordance with the principles of the present invention.

In FIG. 1, a source 10 of wideband (e.g., 100 MHz) color video signals provides output color signal r (red), g (green) and b (blue). Source 10 may, for example, be associated with a computer data display terminal. The r, g and b signals from source 10 are respectively coupled to similar color video signal channels respectively including video signal processors 12a, 12b and 12c, a blanking and clamping signal conditioning circuit 14a, 14b and 14c in accordance with the present invention, and an output display driver and keyed clamp network 20a, 20b and 20c. High level video output color signals R, G and B from the driver/clamp networks are applied to intensity control cathode electrodes 28a, 28b and 28c of a color image displaying kinescope 30. Since the color signal processing channels are similar, only the red color signal channel which receives red color signal r from source 10 will be described in detail.

The r color signal is applied to video processor 12a which includes signal amplifying, level shifting and gain control stages, for example. The video signal from processor 12a is coupled via an input buffer amplifier 15 to blanking and clamping signal conditioning circuit 14a as will be discussed subsequently. A conditioned video output signal from circuit 14a is coupled via an output buffer amplifier 19 to a video output display driver stage 21. A high level color signal R from driver stage 21, after AC coupling via a clamping capacitor 24, is applied to kinescope cathode 28c.

Capacitor 24 acts in conjunction with a keyed clamping DC restoration network 25, e.g., including a keyed diode, for establishing the brightness of a displayed image in accordance with the setting of a viewer adjustable brightness control potentiometer 26 with a wiper coupled to a bias input of network 25. Clamp 25 is keyed to operate during a portion of each horizontal image blanking interval in response to a periodic keying pulse $V_k$. Keying signal $V_k$, together with switching signals S1 and S2 associated with the operation of signal conditioning circuit 14a, are provided from a source of timing signals 35 in response to horizontal (H) and vertical (V) image synchronizing signals derived from deflection circuits of the system (not shown).

Circuit 14a includes a first electronic switch 16 of the single pole, single throw type, connected between an output of buffer 15 and an input terminal of coupling capacitor 17. Buffer amplifier 16 provides an output voltage at a low impedance for charging capacitor 17 when switches 16 and 18 are conductive. Circuit 14a also includes a second electronic switch 18, also of the single pole, single throw type, shunting the video signal path between an output terminal of capacitor 17 and an input of buffer amplifier 19. Buffer amplifier 19 exhibits a high input impedance to prevent excessive discharge of capacitor 17, and a low output impedance to facilitate coupling of the video signal from circuit 14a to succeeding circuits. Switches 16 and 18 respectively respond to timing signals S1 and S2, and switch 18 receives an input reference voltage VR which is conveyed to the video signal path when switch 18 is rendered conductive, i.e., closed, as will be discussed.

Figure 2:
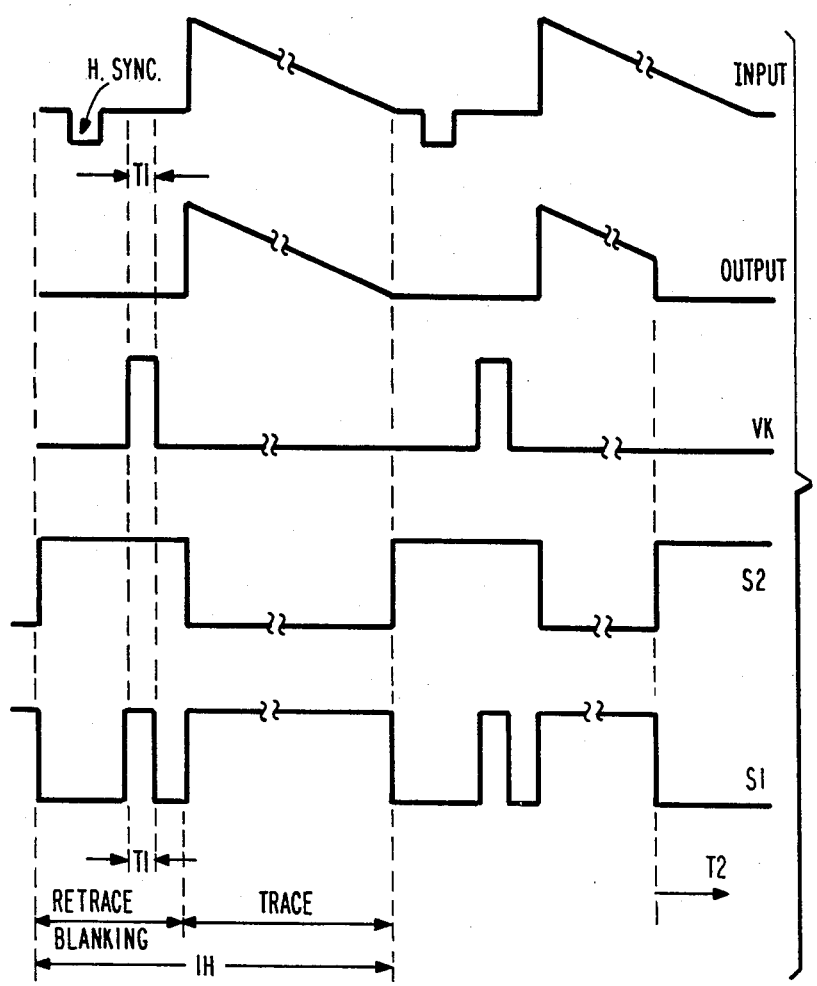
FIG. 2 shows signal waveforms helpful in understanding the operation of the signal conditioning circuit of FIG. 1.

The operation of circuit 14a will be discussed with regard to FIG. 2, which illustrates timing signals S1 and S2 associated with circuit 14a, keying signal VK associated with output clamp 25, an INPUT video signal waveform illustrative of the video signal applied to the input of buffer 15, and an OUTPUT video signal waveform illustrative of the video signal applied to the input of buffer 19.

The INPUT signal waveform illustratively includes two horizontal image lines, each (1H) including an image retrace blanking interval and an image trace interval when image information is to be displayed. The video signal blanking interval includes a horizontal synchronizing (H. SYNC) interval followed by a so-called "back porch" interval including a reference interval T1.

When signal blanking is required, switch 18 connects the input of buffer 19 to a desired blanking reference voltage as represented by reference voltage VR. Switches 16 and 18 are both closed (conductive) during clamping intervals, charging capacitor 17 such that the video signal at the input of buffer 19 exhibits the blanking reference level during back porch reference interval T1 of each horizontal blanking interval. In this circuit, reference voltage VR is both a clamping reference voltage and a blanking reference voltage.

Switch 16 is rendered conductive (i.e., closed) during each horizontal image trace interval when image information is to be displayed, and during reference interval T1 of the "back porch" interval of each horizontal blanking interval, in response to the positive pulse components of timing signal S1. Switch 16 is rendered nonconductive (i.e., open) during the remaining portion of each horizontal blanking interval.

Switch 18 is rendered conductive (i.e., closed) for the duration of each horizontal blanking interval in response to the positive pulse component of timing signal S2. Switch 18 is rendered nonconductive (i.e., open) during each horizontal image trace interval. In some systems switch 18 may be rendered conductive at other times, illustratively at a time T2, when it is desired to apply a given reference voltage to the video signal path. This may be required, for example, to establish a reference for use by an automatic kinescope bias (AKB) control system which automatically maintains a desired bias condition for the kinescope. AKB systems commonly require a video signal reference condition during prescribed intervals when the AKB system is operative. As seen from FIG. 2, a video OUTPUT signal coupled by buffer amplifier 19 to display driver 21 exhibits a fixed blanking reference level, related to blanking reference voltage VR, during the horizontal blanking intervals and at other given times in accordance with the requirements of a given system as mentioned above.

Thus clamping occurs only during time interval T1 when the charge on capacitor 17 is to be changed, at which time switches 16 and 18 are both conductive. During the remainder of the blanking interval, switch 18 remains conductive to provide reference voltage VR to amplifier 19, and switch 16 is nonconductive to prevent any further change in the charge on capacitor 17.

The fixed reference level to which the video signal is clamped during blanking intervals establishes a desired DC level of the video signal, which assists to establish a well-defined DC operating point for display driver stage 21 whereby unwanted DC related changes in the transfer characteristic of the display driver stage are avoided. The established DC level of the video signal also conserves power consumption by the driver stage, and assures full utilization of the available dynamic range of the driver stage.

Clamping and blanking circuit 14a permits blanking interval conditioning of a wideband video signal using few components, i.e., only two uncomplicated single pole, single throw type electronic switches 16 and 18, with two associated buffer stages 15 and 19. The circuit therefore exhibits reduced parasitic capacitance which results in reduced impairment of the high frequency response of the system. The use of a relatively simple switching arrangement also leads to less disturbance of the clamping voltage stored by capacitor 17 due to parasitic switching transients associated with parasitic capacitances of the switches, or leakage currents of the switches.

Figure 3:
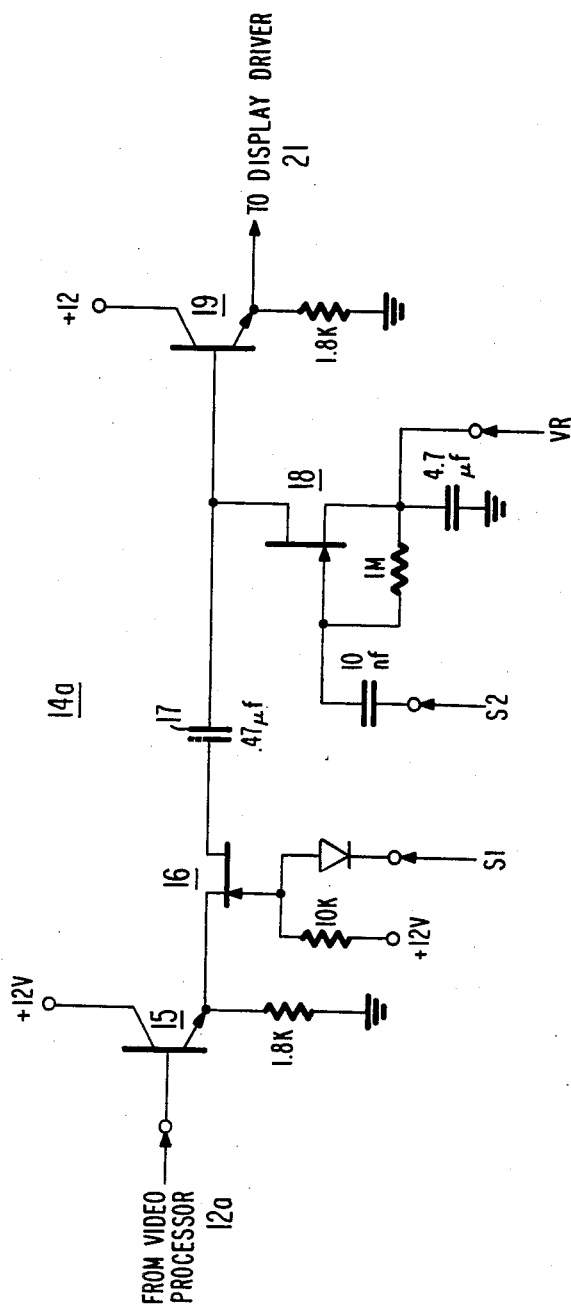
FIG. 3 depicts additional details of the signal conditioning circuit of FIG. 1.

FIG. 3 shows additional circuit details of circuit 14a of FIG. 1, wherein corresponding elements are identified by the same reference number. In FIG. 3, buffer amplifiers 15 and 19 are emitter follower amplifier transistors, and electronic switches 16 and 18 are junction FETs (Field Effect Transistors) with timing signals S1 and S2 applied to gate electrodes of transistors 16 and 18, respectively. Reference voltage VR is applied to a source electrode of transistor 18, a drain electrode of which is coupled to the video signal path. The main current path of transistor 16, as defined by the source and drain electrodes of transistor 16, is coupled in series with the video signal path.

Capacitor 17 can be placed between the emitter of transistor 15 and the source electrode of transistor 16 if an MOS type field effect transistor is used in place of junction FET 16 since, unlike a juntion FET, an MOS device has substantially no on-state gate-to-source leakage current to disturb the charge on capacitor 17. In the circuit of FIG. 3, any gate-to-source leakage current of transistor 16 does not disturb the charge on capacitor 17. Also, any parasitic switching transients (i.e., current spikes associated with gate-to-source parasitic capacitances) which may appear at the source electrode of any FET device when the gate is switched do not disturb the charge on capacitor 17.

What is claimed is:

1. In a system for processing a wideband video signal including an image interval and a blanking interval, apparatus for conditioning said video signal to exhibit a reference level during said blanking interval, said apparatus comprising:

a video signal path having an imput and an output;

a capacitor for coupling a video signal from said input to said output of said video path;

first switching means coupled in series with said capacitor in said signal path, said first switching means having a control input for receiving a timing signal for causing said first switching means to (a) exhibit a conductive state during said image interval and during a prescribed reference portion of said blanking interval for enabling said video signal to be conveyed from said input to said output of said video path via said capacitor, and (b) exhibit a nonconductive state during remaining portions of said blanking interval to prevent said video signal from being conveyed to said output of said video path via said capacitor during said remaining portions of said blanking interval; and second switching means coupled to said capacitor and to a reference potential, said second switching means having a control input for receiving a timing signal for causing said second switching means to (a) exhibit a conductive state for the duration of said blanking interval whereby said reference potential is coupled to said capacitor, and (b) exhibit a nonconductive state at other times.

2. Apparatus according to claim 1, wherein
   said first and second switching means are electronic switches of the single pole, single throw type.

3. Apparatus according to claim 1, wherein
said first switching means is coupled between said input of said video signal path and an input terminal of said capacitor; and
said second switching means is coupled between an output terminal of said capacitor and said reference potential.

4. Apparatus according to claim 3, wherein
each of said first and second switching means is a field effect transistor with a gate electrode for receiving timing signals and a switched main current conduction path defined by source and drain electrodes.

5. Apparatus according to claim 3, wherein
said image and blanking intervals are horizontal image and blanking intervals, and said prescribed reference portion of said blanking interval is a portion of a back-porch interval within said blanking interval.

6. In a system for processing a video signal including an image interval and a blanking interval, said system including an image display device; a display driver amplifier having an input and an output; an AC coupled current path for coupling said output of said display driver amplifier to said display device; and a clamping circuit coupled to said current path; apparatus for conditioning said video signal to exhibit a reference level during said blanking interval comprising:
a video signal path having an input and an output coupled to said input of said driver amplifier;
a capacitor for coupling a video signal from said input to said output of said video path;
first switching means coupled in series with said capacitor in said signal path, said first switching means having a control input for receiving a timing signal for causing said first switching means to (a) exhibit a conductive state during said image interval and during a prescribed reference portion of said blanking interval for enabling said video signal to be conveyed from said input to said output of said video path via said capacitor, and (b) exhibit a nonconductive state during remaining portions of said blanking interval to prevent said video signal from being conveyed to said output of said video path via said capacitor during said remaining portion of said blanking interval; and
second switching means coupled to said capacitor and to a reference potential, said second switching means having a control input for receiving a timing signal for causing said second switching means to (a) exhibit a conductive state for the duration of said blanking interval whereby said reference potential is coupled to said capacitor, and (b) exhibit a nonconductive state at other times.

7. Apparatus according to claim 6, wherein
said first and second switching means are electronic switches of the single pole, single throw type.

8. Apparatus according to claim 6, wherein
said first switching means coupled between said input of said video signal path and an input terminal of said capacitor; and
said second switching means is coupled between an output terminal of said capacitor and said reference potential.

9. Apparatus according to claim 8, wherein
each of said first and second switching means is a field effect transistor with a gate electrode for receiving timing signals and a switched main current conduction path defined by source and drain electrodes.

10. Apparatus according to claim 8, wherein
said image and blanking intervals are horizontal image and blanking intervals, and said prescribed reference portion of said blanking interval is a portion of a back-porch interval within said blanking interval.

* * * * *